Figure 1:
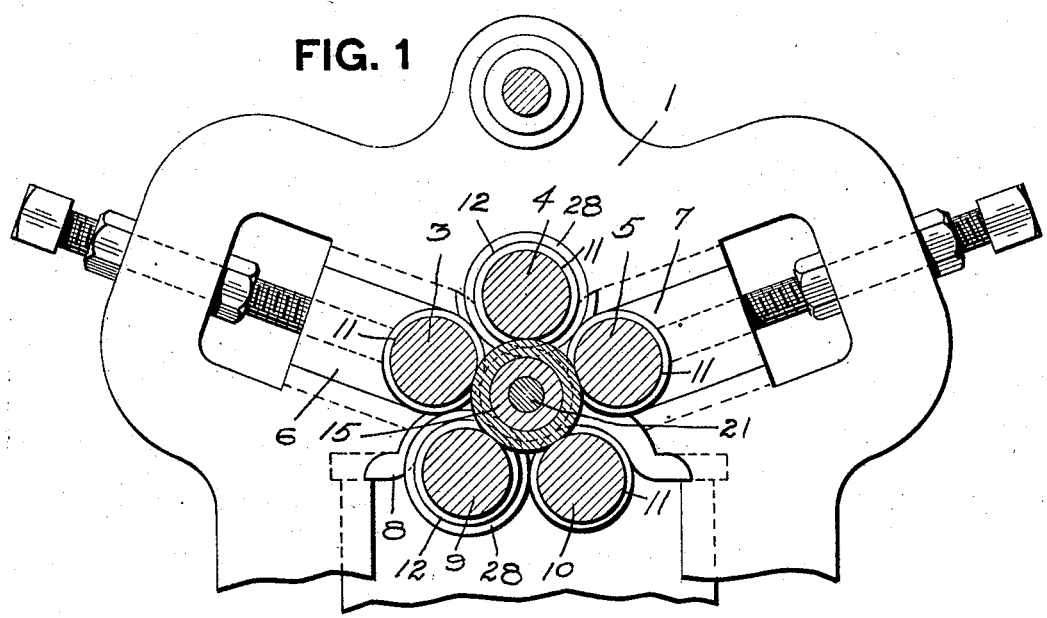

No. 800,303. PATENTED SEPT. 26, 1905.
J. A. & H. W. HOCK.
APPARATUS FOR WELDING PIPE COUPLINGS.
APPLICATION FILED JULY 13, 1904.

3 SHEETS—SHEET 1.

WITNESSES.
INVENTORS.

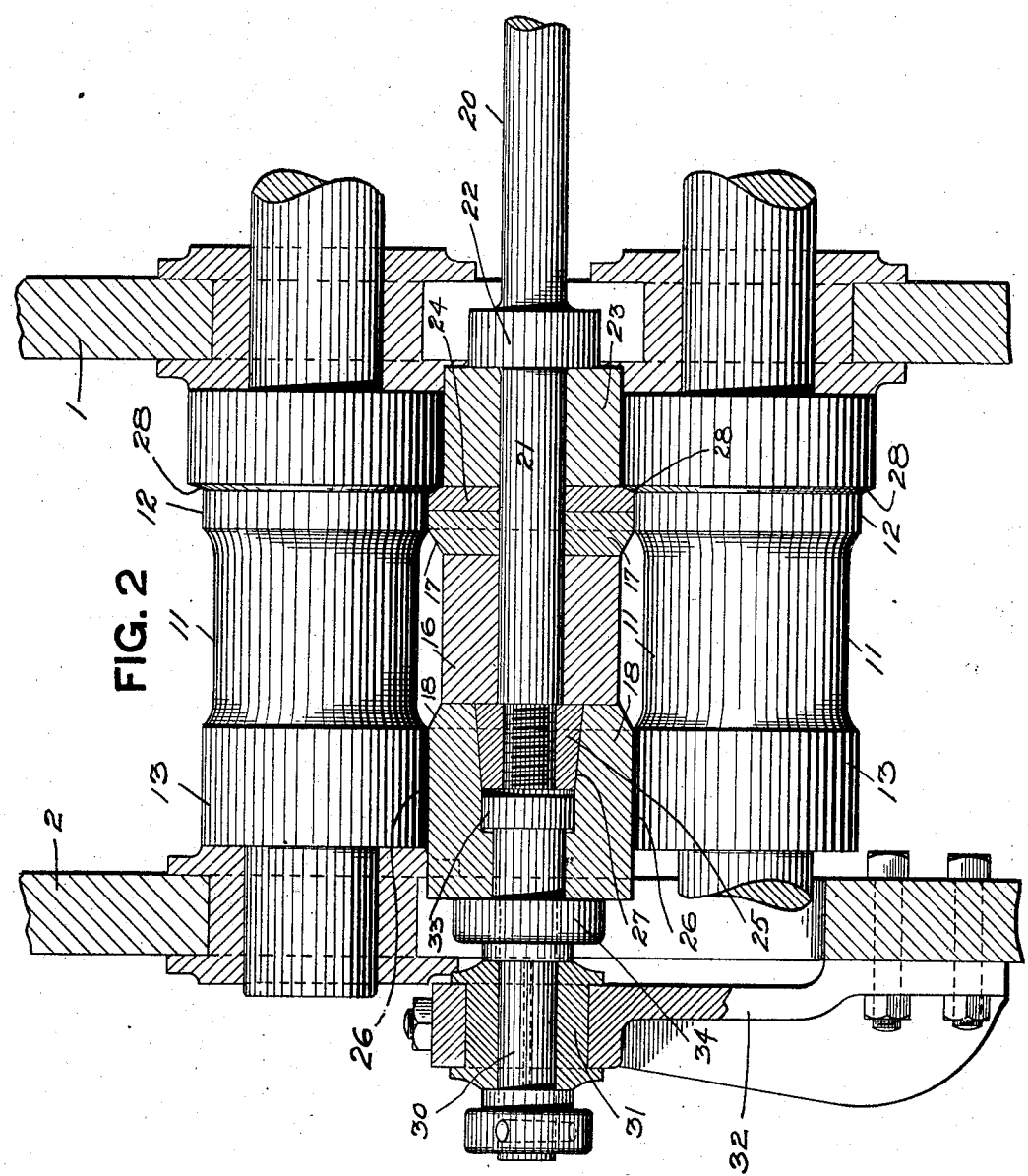

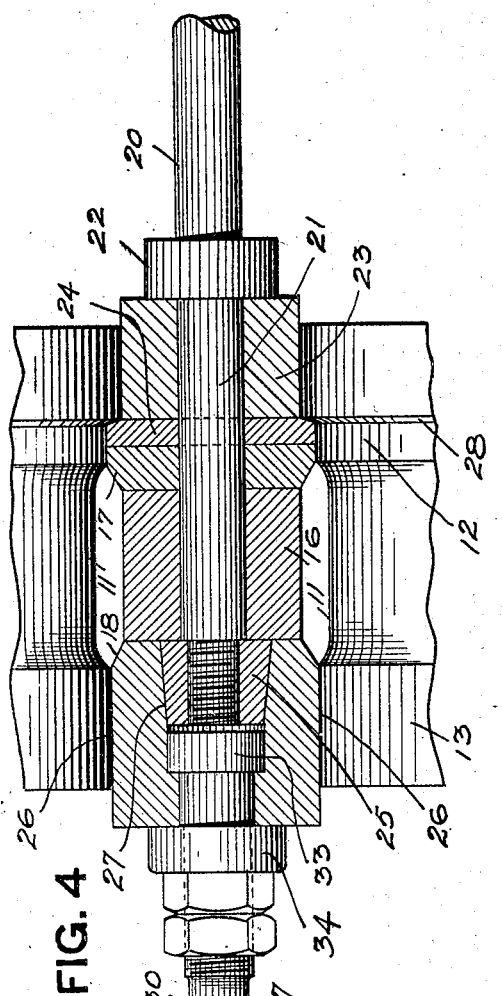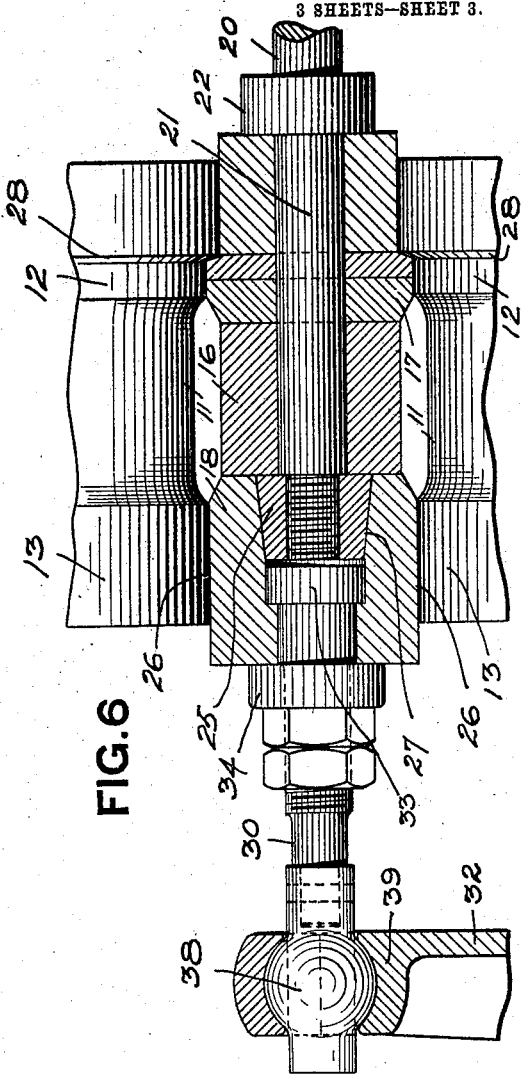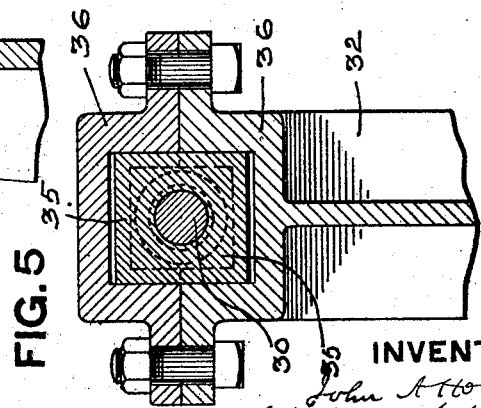

UNITED STATES PATENT OFFICE.

JOHN A. HOCK, OF PITTSBURG, PENNSYLVANIA, AND HENRY W. HOCK, OF YOUNGSTOWN, OHIO, ASSIGNORS TO NATIONAL TUBE COMPANY, OF PITTSBURG, PENNSYLVANIA, A CORPORATION OF NEW JERSEY.

APPARATUS FOR WELDING PIPE-COUPLINGS.

No. 800,303.　　　Specification of Letters Patent.　　Patented Sept. 26, 1905.

Application filed July 13, 1904. Serial No. 216,398.

*To all whom it may concern:*

Be it known that we, JOHN A. HOCK, a resident of Pittsburg, in the county of Allegheny and State of Pennsylvania, and HENRY W. HOCK, a resident of Youngstown, county of Mahoning, State of Ohio, have invented a new and useful Improvement in Apparatus for Welding Pipe-Couplings; and we do hereby declare the following to be a full, clear, and exact description thereof.

Our invention relates to apparatus for manufacturing pipe sockets or couplings and similar ring-shaped metal articles.

The object of our invention is to provide apparatus whereby in the welding of the socket or coupling it is provided with countersunk recesses on its inner face at both ends, so as to dispense with the usual counterboring resorted to in the manufacture of these articles.

In the manufacture of pipe sockets and couplings a plate or bar of the necessary length, width, and thickness for the desired coupling is bent into ring form, then welded and shaped to form the coupling. The couplings are then threaded internally and counterbored at each end either to give a proper finish or else to remove the threads for a short distance, so as to form an enlarged portion at the ends of the couplings which will permit them to be screwed onto the pipes to such a distance as to cover the threads on the pipe where they run out. This counterboring is usually done at only one end of the coupling at a time, thus necessitating clamping the coupling into the chuck twice in order to counterbore both ends. The time and labor consumed in doing this adds materially to the cost of the couplings.

The object of our invention is to provide welding and shaping apparatus for manufacturing couplings or sockets and similar articles which will form such articles with countersunk recesses at both ends, so as to dispense with the counterboring above referred to, thus resulting in a material saving of time and labor in finishing the couplings. Furthermore, such recesses diminish the distance through which the tap must cut in threading the coupling, so that a considerable saving of time in threading also results.

To the accomplishment of the aforesaid object, our invention consists, generally stated, in welding and shaping apparatus comprising a cluster of rolls, together with a mandrel disposed between said rolls, and having a working face corresponding in diameter and contour to the interior of the coupling to be made and having at each side of such working face portions of enlarged diameter, which during the welding and shaping of the coupling project into the pass of the rolls and form the countersunk recesses in the inner face of the ends of the coupling. The mandrel, in order to be removable from the coupling, is made in two transversely-separable sections, one of which is mounted in stationary bearings and the other of which is held against endwise displacement during the welding and shaping operation by suitable means, preferably coöperating annular shoulders on the rolls and mandrel-section.

Figure 3:
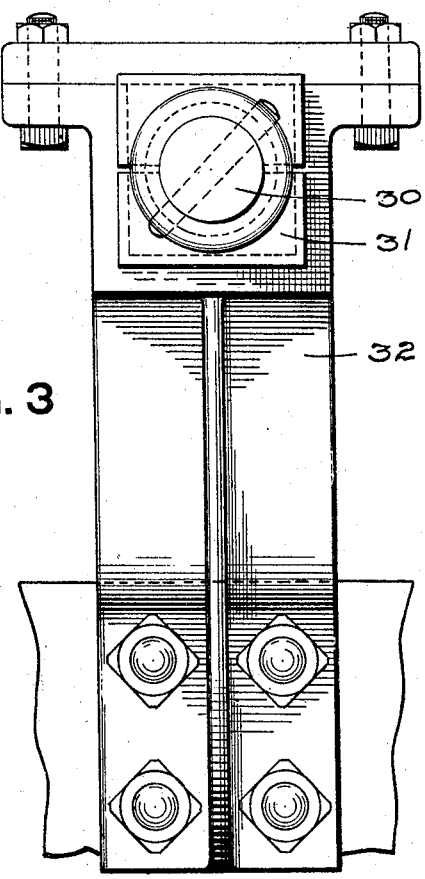

In the accompanying drawings, Figure 1 is a cross-section through welding-rolls suitable for carrying out our invention. Fig. 2 is a longitudinal section showing the shape of rolls and mandrel and one manner of preventing longitudinal movement of the mandrel. Fig. 3 is an end view of the bearing for the stationary mandrel-section. Fig. 4 is a view similar to Fig. 2, showing a modification. Fig. 5 is a transverse vertical section through the bearing for the stationary mandrel-section of Fig. 4; and Fig. 6 is a view similar to Figs. 2 and 4, showing a modification of the means for mounting the stationary mandrel-section.

Our apparatus comprises a sectional mandrel, together with suitable welding and shaping apparatus coöperating therewith. The welding and shaping apparatus may, if desired, be hammer-dies, such as frequently employed for making pipe couplings or sockets, but preferably consists of a cluster of welding and shaping rolls surrounding the mandrel. The latter has been illustrated. This cluster of rolls preferably comprises five rolls mounted in suitable housings 1 and 2. Three of said rolls—such as the top rolls 3, 4, and 5—are mounted directly in said housings and during the welding operation are held stationary, 4 being mounted in fixed bearings, while the rolls 3 and 5 are mounted in adjustable bearings 6 and 7, so that they can be brought to the proper position relative to the other rolls in the cluster. Below these three rolls is the sliding bearing 8, which has mounted in its upper end the rolls 9 and 10, so forming the five rolls of the cluster. The movable lower rolls permit the cluster to be opened up to permit the removal of the mandrel and welded coupling. The several rolls of the cluster have working faces 11 of the proper size and contour to shape the desired coupling and the end flanges 12 and 13, which contact with the mandrel and confine the blank. These rolls will be driven in any suitable way, as is now the custom.

Located within the cluster of rolls is the mandrel 15, and this comprises the essential element of our improvement. The mandrel has a body portion 16, corresponding in diameter and shape to the interior of the coupling, and has at both ends of said body portion portions of enlarged diameter 17 and 18, which project inwardly beyond the flanges 12 and 13 of the rolls into the pass of said rolls and form the countersunk recesses in the ends of the coupling. In order that the welded coupling can be removed from this mandrel, it is necessary to form the latter in two sections, and it is so shown. One of these mandrel-sections comprises the central portion 16 and the enlarged end portion 17. This mandrel-section is removable from the cluster of rolls and is provided with a handle 20 for manipulating the same. Preferably this section is built up of separable parts to facilitate repair and compensate for wear, as described and claimed in our application filed September 22, 1903, Serial No. 174,207. To this end the central portion 16 and enlarged end portion 17 are formed as sleeves surrounding an arbor 21, integral with the handle 20. On the handle 20 is a shoulder 22, and between the same and the part 17 are sleeves 23 and 24, the latter being larger than the former. The sleeves 16, 17, 23, and 24 are clamped onto the arbor 21 by means of a nut 25, screwed onto the end of the arbor. The other mandrel-section comprises the enlarged portion 18, having a straight cylindrical face which contacts with the roll-flanges 13, and this section preferably will be mounted in stationary bearings and is not removable from the machine. As shown, this section is provided with a bearing-face 26, against which contact the flanges 13 of the rolls. The meeting faces of the two sections of the mandrel will be provided with a coöperating socket and projection, so as to aline said mandrel-sections, and, as shown, the section 18 is provided with a tapered socket 27, while the other section is provided with a tapering end which projects into the socket of the section 18, this tapering end being conveniently formed by the nut 25.

During the welding and shaping operation the pressure of the metal against the enlarged portions 17 and 18 of the mandrel tends to force the two sections outwardly. The section 16 may be prevented from outward movement by various means, but preferably by coöperating annular shoulders on the rolls and on the mandrel. The roll-flanges 12 are shown as provided with annular shoulders 28, and the end of the mandrel-section, such as the sleeve 23, is reduced, while the sleeve 24 forms an annular shoulder which bears against the shoulders 28 of the rolls and prevents endwise movement of said mandrel. Various other means may be provided for this purpose.

The mandrel-section 18 will be mounted rotatably in or on any suitable stationary bearings and will thus be held against endwise displacement. As shown in the drawings, said section is mounted on a short journal extension 30, mounted in the stationary bearings 31, which may be mounted in a standard 32, which may be a portion of the roll-housings, or suitably secured thereto or located in any other convenient place. The journal 30 is rotatable in the bearings 31 and may be integral with the mandrel-section. Preferably the mandrel-section is rotatably mounted on the journal. This can conveniently be done by providing the section 18 with an enlarged bore for receiving a head 33 on the journal. A nut 34, threaded on the journal, bears against the end of the sleeve 18, holding the same against the head 31.

In Figs. 4 and 5 the brasses 35 are held loosely in a bearing 36, so as to have movement sidewise and also up and down, and the journal extension is provided with collars 37 to take the end thrust. The movement of the bearing-brasses permits the mandrel to have movement in all directions to accommodate itself to variations in the thickness of metal forming the coupling. In Fig. 6 the same result is secured by providing a universal bearing for the journal extension, such as providing on the journal a spherical enlargement 38, which is mounted in corresponding bearings 39.

In the use of the apparatus described the mandrel will be inserted in the rolls, and a heated blank of the proper length is fed into the rolls in the usual way and will be coiled by the same around the mandrel and simultaneously shaped and welded. During this operation the mandrel is free to rotate with the rolls, and the mandrel-sections will be held against endwise movement by the means described and will be in such position that the enlarged portions 17 and 18 project into the pass of the rolls beyond the flanges 12 and 13 thereof and will thus form the countersunk recesses in the ends of the roll. When the welding and shaping of the coupling is finished, the rolls will be opened and the mandrel-section 16 will then be removed, carrying with it the welded coupling, while the section 18 of the mandrel will remain in position in the machine. The coupling will be stripped from the mandrel-section 16 and the latter again inserted in the rolls and the foregoing operation repeated.

After being welded and shaped in the manner described the coupling will be taken to the tapping-machine and threaded internally. The countersunk recesses in the ends of the coupling reduce the distance through which the tap must cut and as a consequence reduce the time necessary to thread the coupling. Furthermore, the ends of the coupling need not be counterbored, thus saving entirely this step in the manufacture of these articles.

What we claim is—

1. In apparatus for welding and shaping pipe-couplings and similar articles, the combination of a mandrel formed in two transversely-separable sections and provided with a central portion corresponding in diameter and shape to the interior of the coupling and with a portion of enlarged diameter at each side of said central portion, a plurality of welding and shaping devices coöperating with said mandrel, said devices having welding-faces of greater width than the central working face of the mandrel and having flanges or collars at their ends contacting with the mandrel to confine the blank, a stationary bearing in which one of said mandrel-sections is mounted and which serves to take the end thrust of said mandrel-section during the welding and shaping operation, said mandrel-section and coöperating flanges of the welding devices having substantially straight contacting faces, and means for preventing endwise movement of the other mandrel-section during the welding operation.

2. In apparatus for welding and shaping pipe-couplings and similar articles, the combination of a mandrel and a cluster of rolls surrounding the same, said rolls being provided with working faces and with flanges at the sides thereof and which contact with the mandrel to confine the blank, said mandrel being formed of two transversely-separable sections, one of said sections having a body portion corresponding in diameter and shape to the interior of the coupling and having at the sides thereof a portion of enlarged diameter projecting into the pass of the rolls, means for holding said section against endwise movement during the welding operation, the other of said sections having a cylindrical portion contacting with the roll-flanges and projecting into the roll-pass, and a stationary bearing in which said last-named mandrel-section is mounted and which serves to take the end thrust of said section during the welding and shaping operation.

3. In apparatus for welding and shaping pipe-couplings and similar articles, the combination of a mandrel and a cluster of rolls surrounding the same, said rolls having at the sides of their working faces flanges which contact with the mandrel and confine the blank, said mandrel being formed in two transversely-separable sections, one of said sections being provided with a body portion corresponding in diameter and shape to the interior of the coupling, and having at the side thereof a portion of enlarged diameter projecting into the pass of the rolls, coöperating annular shoulders on said rolls and mandrel-section to prevent endwise movement of the latter, the other mandrel-section having a straight cylindrical portion contacting with the roll-flanges and being of larger diameter than the body of the first section and projecting into the pass of the rolls, and bearings on which said last-named section is rotatably mounted, and which serve to take the end thrust of said mandrel-section during the welding and shaping operation.

4. In apparatus for welding and shaping pipe-couplings and similar articles, the combination of a mandrel and a cluster of rolls surrounding the same, said rolls having at the sides of their working faces flanges which contact with the mandrel and confine the blank, said mandrel being formed in two transversely-separable sections, one of said sections comprising a central portion corresponding in diameter and shape to the interior of the coupling and having at the side of said portion an end portion of enlarged diameter which projects into the pass of the rolls, means for holding said section against endwise movement during the shaping and welding operation, the other section of said mandrel having a portion of larger diameter than the body of the other section and having a straight cylindrical face contacting with the roll-flanges and also projecting into the pass of the rolls, and stationary bearings in which said last-named section is mounted, said bearings being constructed to permit said mandrel-section to have both rotary and oscillating movement, and serving to take the end thrust of said mandrel-section during the welding and shaping operation.

5. In apparatus for welding and shaping pipe-couplings and similar articles, the combination of a mandrel and a cluster of rolls surrounding the same, said rolls having at the sides of their working faces flanges which contact with the mandrel and confine the blank, said mandrel being formed in two transversely-separable sections, one of said sections comprising a central portion corresponding in diameter and shape to the interior of the coupling and having at the side of said portion an end portion of enlarged diameter which projects into the pass of the rolls, means for holding said section against endwise movement during the shaping and welding operation, the other section of said mandrel having a portion of larger diameter than the body of the other section and having a straight cylindrical face contacting with the roll-flanges and also projecting into the pass of the rolls, a spindle journaled to said last-named section, a circular enlargement on said spindle, and bearings in which said enlargement is mounted and constructed to allow said enlargement to both rotate and oscillate, and serving to take the end thrust of said mandrel-section during the welding and shaping operation.

6. In apparatus for welding and shaping pipe-couplings and similar articles, the combination of a mandrel and a cluster of rolls surrounding the same, said rolls having at the sides of their working faces flanges which contact with the mandrel and confine the blank, said mandrel being formed in two transversely-separable sections, one of said sections comprising a central portion corresponding in diameter and shape to the interior of the coupling and having at the side of said portion an end portion of enlarged diameter which projects into the pass of the rolls, means for holding said section against endwise movement during the shaping and welding operation, the other section of said mandrel having a straight cylindrical portion contacting with the roll-flanges and being of larger diameter than the body of the other section and also projecting into the pass of the rolls, a spindle on which said last-named section is rotatably mounted, and bearings for said spindle constructed to take the end thrust of said mandrel-section during the welding and shaping operation.

In testimony whereof we, the said JOHN A. HOCK and HENRY W. HOCK, have hereunto set our hands.

JOHN A. HOCK.
HENRY W. HOCK.

Witnesses for John A. Hock:
F. W. WINTER,
G. C. RAYMOND.

Witnesses for Henry W. Hock:
W. L. KAUFFMAN,
D. E. E. WOODSIDE.